US008973559B2

(12) United States Patent
Inagaki et al.

(10) Patent No.: US 8,973,559 B2
(45) Date of Patent: Mar. 10, 2015

(54) GEAR SUBASSEMBLY AND EXHAUST GAS RECIRCULATION SYSTEM

(75) Inventors: Noriyuki Inagaki, Chiryu (JP); Yuichiro Moritani, Kariya (JP); Koji Hashimoto, Anjo (JP); Takaaki Ohashi, Iwakura (JP); Shinsuke Miyazaki, Chiryu (JP)

(73) Assignee: Denso Corporation, Kariya (JP)

( * ) Notice: Subject to any disclaimer, the term of this patent is extended or adjusted under 35 U.S.C. 154(b) by 195 days.

(21) Appl. No.: 13/478,379

(22) Filed: May 23, 2012

(65) Prior Publication Data

US 2012/0297766 A1 Nov. 29, 2012

(30) Foreign Application Priority Data

May 25, 2011 (JP) ................................ 2011-116984

(51) Int. Cl.
*F02B 47/08* (2006.01)
*F02M 25/07* (2006.01)
*F16H 21/00* (2006.01)

(52) U.S. Cl.
CPC ....... *F02M 25/0786* (2013.01); *F02M 25/0714* (2013.01); *F02M 25/0773* (2013.01); *F02M 25/0793* (2013.01); *F02M 25/0707* (2013.01); *F02M 25/0709* (2013.01); *F02M 25/0718* (2013.01); *F02M 25/0724* (2013.01); *F02M 25/0728* (2013.01); *F02M 25/0732* (2013.01); *Y02T 10/121* (2013.01)
USPC ............ 123/568.24; 123/568.19; 123/568.18; 123/568.23; 74/22 R

(58) Field of Classification Search
USPC ............ 123/568.24, 568.19, 568.12, 568.21, 123/337, 90.6, 568.16; 60/605.2; 251/129.03, 129.11, 248, 251, 259, 251/304, 305
See application file for complete search history.

(56) References Cited

U.S. PATENT DOCUMENTS

| | | | | |
|---|---|---|---|---|
| 2003/0041821 | A1 | 3/2003 | Ito et al. | |
| 2005/0045128 | A1 * | 3/2005 | White et al. | 123/90.17 |
| 2007/0193542 | A1 * | 8/2007 | Wood | 123/90.31 |
| 2010/0206274 | A1 | 8/2010 | Furukawa et al. | |
| 2011/0023846 | A1 * | 2/2011 | Miyazaki et al. | 123/568.16 |

FOREIGN PATENT DOCUMENTS

| | | |
|---|---|---|
| JP | 55-122555 | 8/1980 |
| JP | 2002-147206 | 5/2002 |
| JP | 2003-065008 | 3/2003 |

(Continued)

OTHER PUBLICATIONS

U.S. Appl. No. 13/308,717, Shinsuke Miyazaki et al., filed Dec. 1, 2011.

*Primary Examiner* — Stephen K Cronin
*Assistant Examiner* — George Jin
(74) *Attorney, Agent, or Firm* — Nixon & Vanderhye P.C.

(57) ABSTRACT

A gear subassembly is for an exhaust gas recirculation (EGR) system including an EGR valve and a rotatable shaft provided for the EGR valve. The gear subassembly includes a gear and a cam. The gear is a part of reduction gears and is fastened to the rotatable shaft to rotate therearound. The cam is fastened to the gear and is a part of a link mechanism. The gear includes a metal shaft-fastening part used for fastening the gear to the rotatable shaft, and a metal cam-fastening part used for fastening the gear to the cam. The gear is formed by resin-molding with the shaft-fastening part and the cam-fastening part serving as insert parts.

7 Claims, 7 Drawing Sheets

(56) References Cited

FOREIGN PATENT DOCUMENTS

| | | |
|---|---|---|
| JP | 2009-061503 | 3/2009 |
| JP | 2010-190116 | 9/2010 |
| JP | 2010-261513 | 11/2010 |
| JP | 2010-265923 | 11/2010 |

* cited by examiner

GEAR SUBASSEMBLY AND EXHAUST GAS RECIRCULATION SYSTEM

CROSS REFERENCE TO RELATED APPLICATION

This application is based on Japanese Patent Application No. 2011-116984 filed on May 25, 2011, the disclosure of which is incorporated herein by reference.

TECHNICAL FIELD

The present disclosure relates mainly to a gear subassembly obtained by integrating a gear which constitutes a part of reduction gears, and a cam which constitutes a part of a link mechanism.

BACKGROUND

Conventionally, a system, in which a gear subassembly is configured as a single component, is widely known for an exhaust gas recirculation system (hereinafter referred to as an EGR system) that recirculates exhaust gas discharged from an internal combustion engine into an intake-air passage (see, for example, JP-A-2010-190116 corresponding to US2010/0206274A1).

A system provided with a turbocharger that rotates an exhaust turbine by exhaust gas and compresses intake air through a compressor coaxial with the exhaust turbine is known for an air intake and exhaust system of the engine. In the air intake and exhaust system equipped with the turbocharger, the EGR system recirculates exhaust gas into an intake passage mainly through a low-pressure EGR passage that communicates between an exhaust passage on a downstream side of the exhaust turbine in an exhaust gas flow direction, and the intake passage on an upstream side of the compressor in an intake air flow direction.

The EGR system includes an EGR valve that changes an opening degree of the low-pressure EGR passage so as to increase or decrease the amount of exhaust gas recirculated, an electric motor that generates output for driving the EGR valve, reduction gears that decelerate the output of the electric motor to transmit it to the EGR valve, an intake throttle valve that reduces a flow of intake air in the intake passage on an upstream side of an exhaust-gas merging part in the intake air flow direction, and a link mechanism that synchronizes movement of the intake throttle valve with movement of the EGR valve.

The gear subassembly is configured, for example, by integrating a gear that is a part of the reduction gears and is fastened to a rotatable shaft of the EGR valve, and a cam having a cam profile that is a part of the link mechanism and shows a synchronization pattern of the intake throttle valve relative to the EGR valve, and the subassembly thereby serves as one component of the EGR system. Recent demand for high fuel efficiency of a vehicle is extremely great. To cope with such demand for fuel efficiency, request for weight saving of the gear subassembly becomes high, too.

SUMMARY

According to the present disclosure, there is provided a gear subassembly for an exhaust gas recirculation (EGR) system including an EGR valve and a rotatable shaft provided for the EGR valve. The gear subassembly includes a gear and a cam. The gear is a part of reduction gears and is fastened to the rotatable shaft to rotate therearound. The cam is fastened to the gear and is a part of a link mechanism. The gear includes a metal shaft-fastening part used for fastening the gear to the rotatable shaft, and a metal cam-fastening part used for fastening the gear to the cam. The gear is formed by resin-molding with the shaft-fastening part and the cam-fastening part serving as insert parts.

According to the present disclosure, there is also provided an exhaust gas recirculation (EGR) system that is a part of an air intake and exhaust system for an internal combustion engine. The air intake and exhaust system includes a turbocharger, an exhaust passage for exhaust gas, and an intake passage for intake air. The turbocharger has an exhaust turbine and a compressor coaxial with the exhaust turbine, and is configured to rotate the exhaust turbine by exhaust gas discharged from the engine and to compress intake air drawn into the engine through the compressor. The EGR system includes the gear subassembly, an EGR passage, the EGR valve, an electric motor, and an intake throttle valve. A part of exhaust gas is recirculated through the EGR passage from the exhaust passage on a downstream side of the exhaust turbine in a flow direction of exhaust gas into the intake passage on an upstream side of the compressor in a flow direction of intake air. The EGR valve is configured to open or close the EGR passage. The electric motor is configured to generate output to drive the EGR valve. The intake throttle valve is disposed in the intake passage to reduce a flow of intake air on an upstream side of a connecting portion between the intake passage and the EGR passage in the flow direction of intake air. The reduction gears are configured to decelerate the output of the electric motor and transmit the decelerated output to the EGR valve. The rotatable shaft is a rotation center of the EGR valve. The link mechanism is configured to synchronize movement of the intake throttle valve with movement of the EGR valve.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
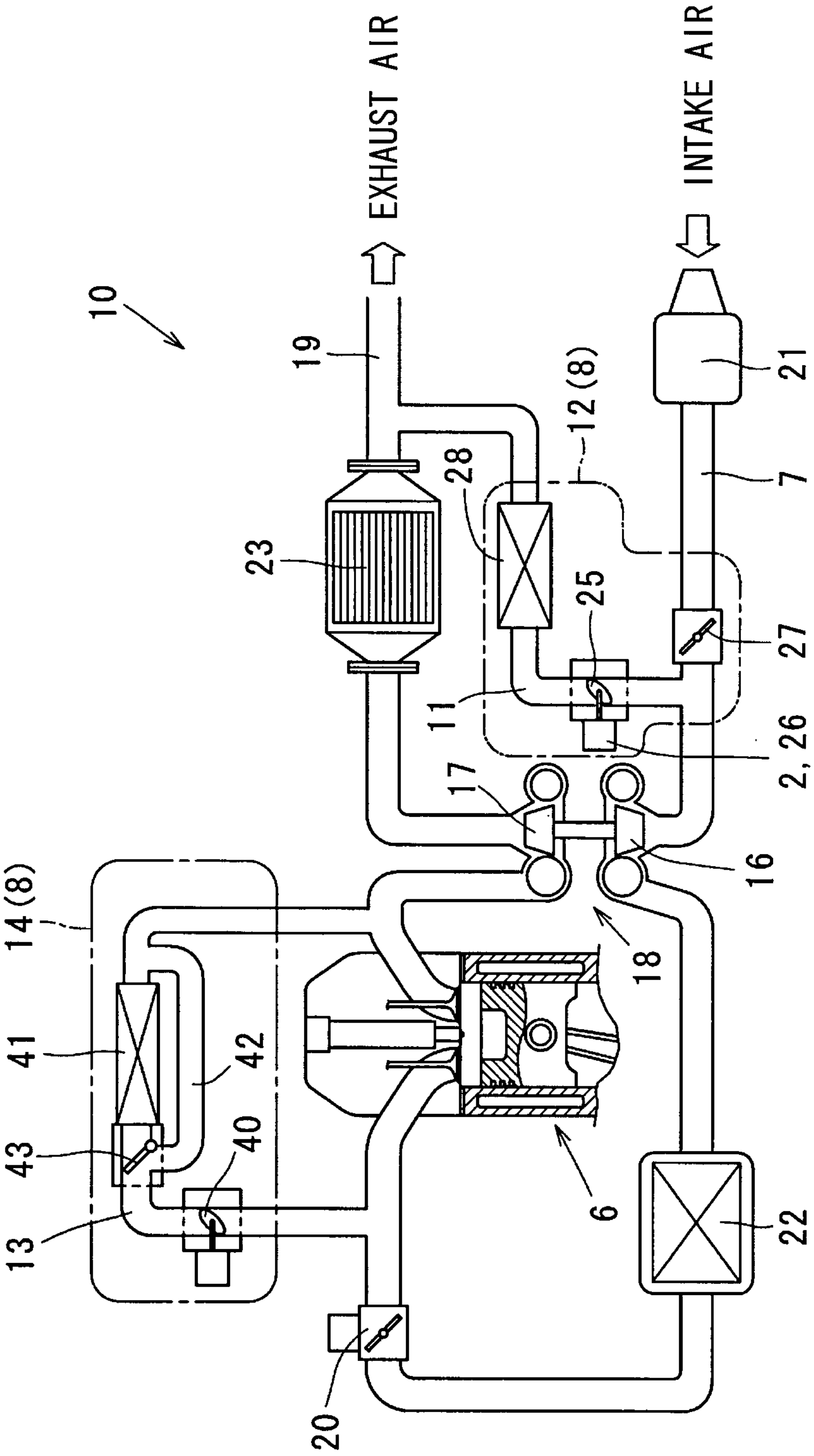
FIG. 1 is a diagram illustrating a configuration of an air intake and exhaust system of an internal combustion engine in accordance with a first embodiment.
Figure 2:
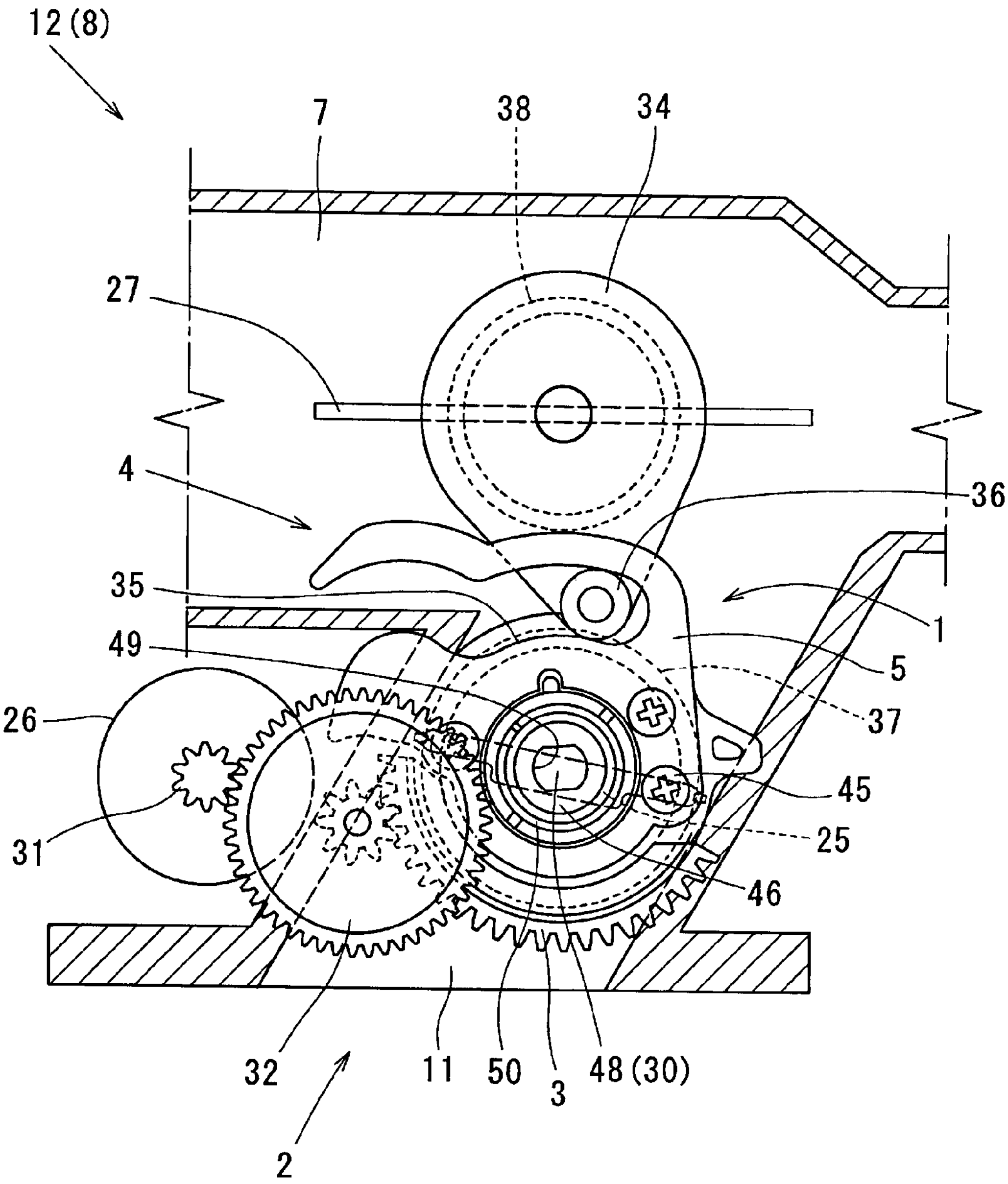
FIG. 2 is a diagram illustrating a configuration of an EGR system in accordance with the first embodiment.
Figure 3B:
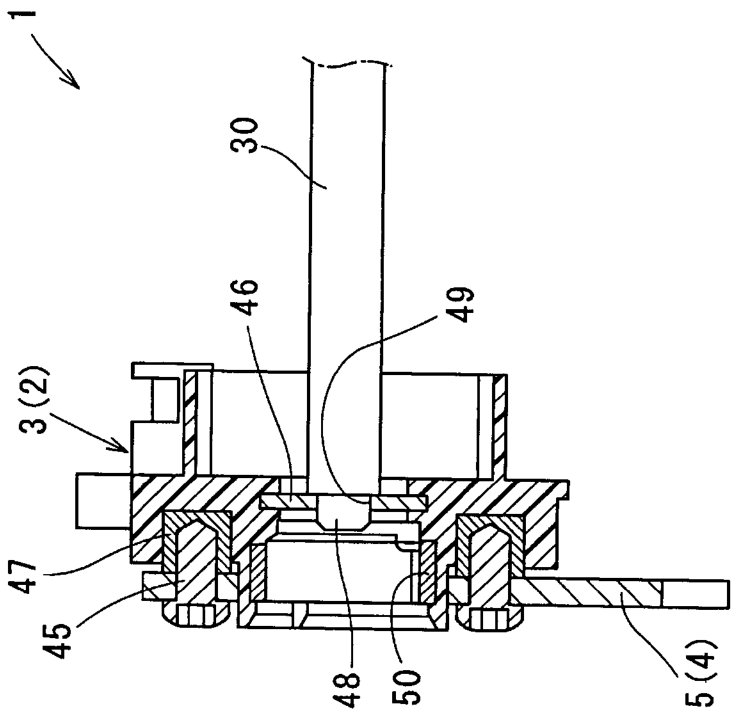
FIG. 3B is a sectional view taken along a line IIIB-IIIB in FIG. 3A.
Figure 3A:
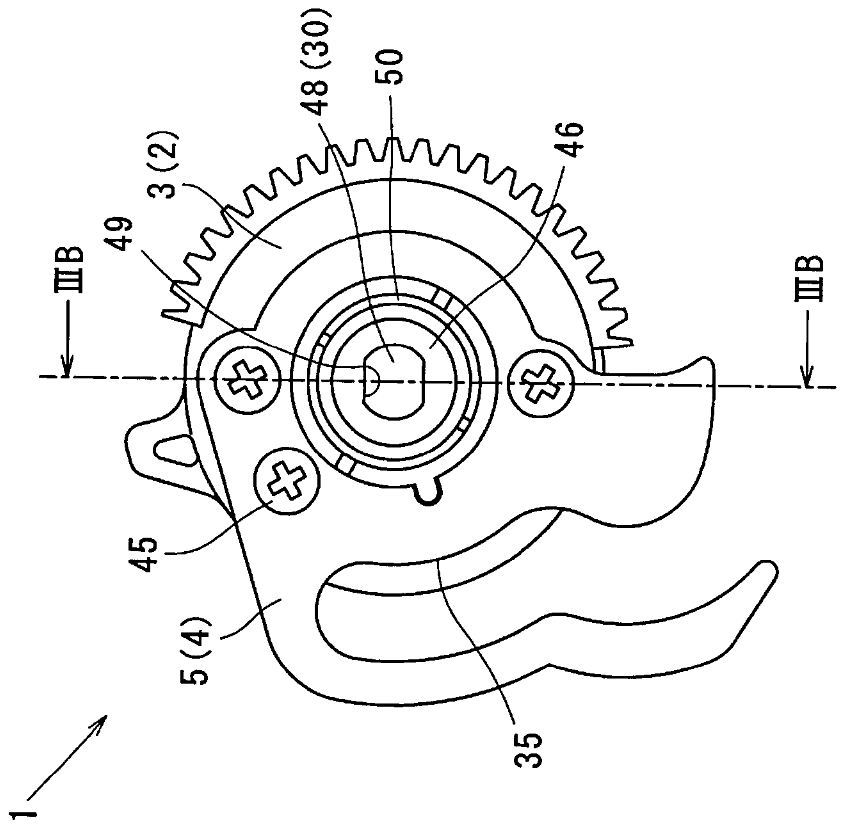
FIG. 3A is a plan view illustrating a gear subassembly in accordance with the first embodiment.
Figure 4:
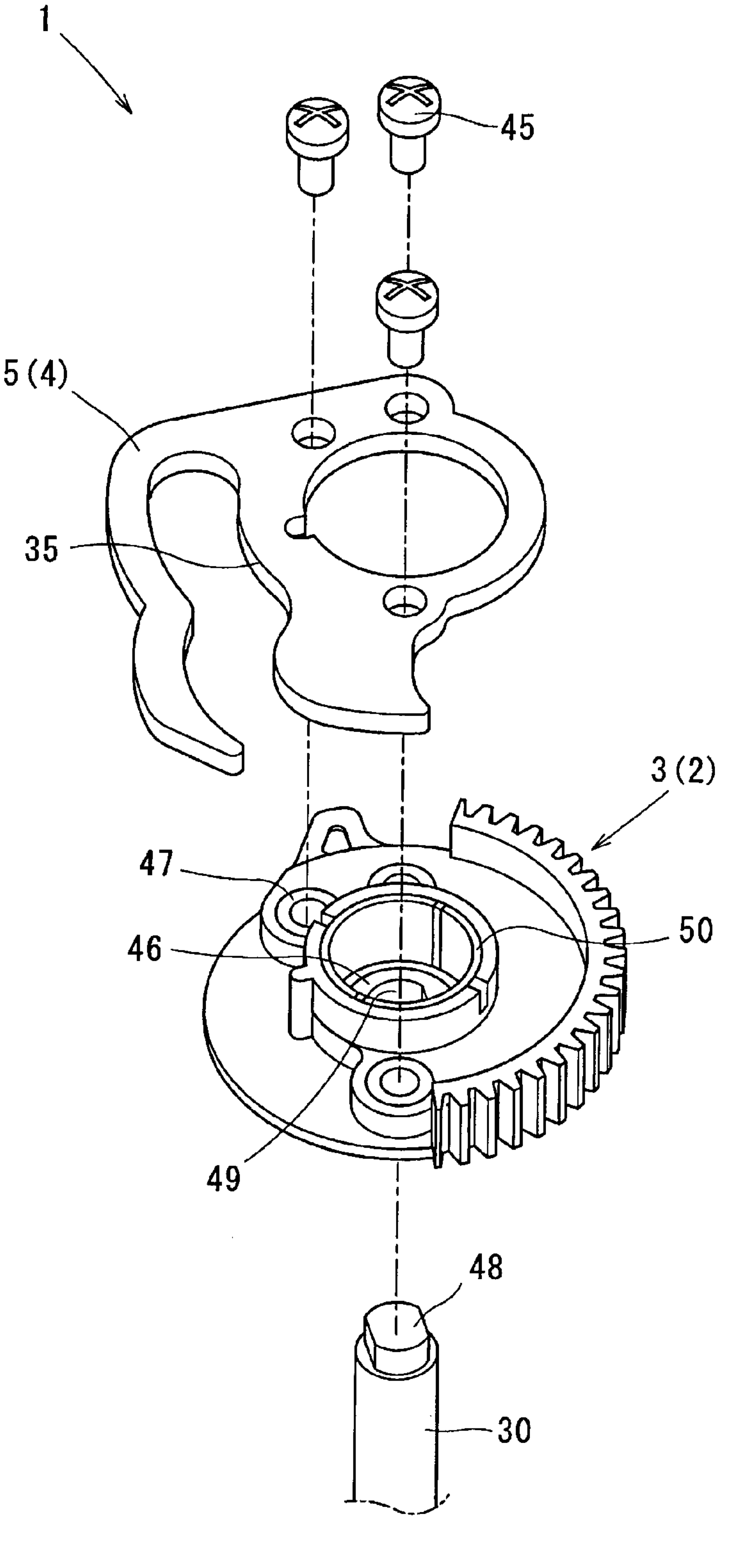
FIG. 4 is an exploded perspective view illustrating the gear subassembly of the first embodiment.
Figure 5A:
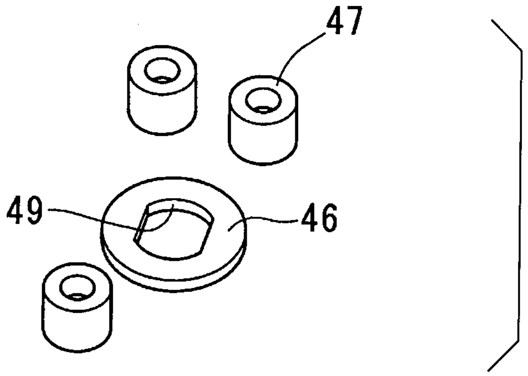
FIG. 5A is a perspective view illustrating a plate and a nut in accordance with the first embodiment.
Figure 5B:
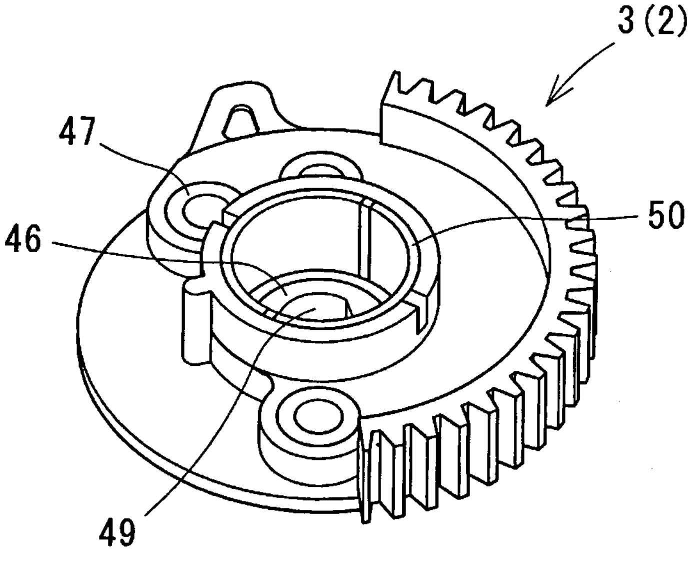
FIG. 5B is a perspective view illustrating a gear in accordance with the first embodiment.

In accordance with a first embodiment, a gear subassembly is for an exhaust gas recirculation (EGR) system including an EGR valve and a rotatable shaft provided for the EGR valve. The gear subassembly includes a gear and a cam. The gear is a part of reduction gears and is fastened to the rotatable shaft to rotate therearound. The cam is fastened to the gear and is a part of a link mechanism. The gear includes a metal shaft-fastening part used for fastening the gear to the rotatable shaft, and a metal cam-fastening part used for fastening the gear to the cam. The gear is formed by resin-molding with the shaft-fastening part and the cam-fastening part serving as insert parts.

An exhaust gas recirculation (EGR) system is a part of an air intake and exhaust system for an internal combustion engine. The air intake and exhaust system includes a turbocharger, an exhaust passage for exhaust gas, and an intake passage for intake air. The turbocharger has an exhaust turbine and a compressor coaxial with the exhaust turbine, and is configured to rotate the exhaust turbine by exhaust gas discharged from the engine and to compress intake air drawn into the engine through the compressor. The EGR system includes the gear subassembly, an EGR passage, the EGR valve, an electric motor, and an intake throttle valve. A part of exhaust gas is recirculated through the EGR passage from the exhaust passage on a downstream side of the exhaust turbine in a flow direction of exhaust gas into the intake passage on an upstream side of the compressor in a flow direction of intake air. The EGR valve is configured to open or close the EGR passage. The electric motor is configured to generate output to drive the EGR valve. The intake throttle valve is disposed in the intake passage to reduce a flow of intake air on an upstream side of a connecting portion between the intake passage and the EGR passage in the flow direction of intake air. The reduction gears are configured to decelerate the output of the electric motor and transmit the decelerated output to the EGR valve. The rotatable shaft is a rotation center of the EGR valve. The link mechanism is configured to synchronize movement of the intake throttle valve with movement of the EGR valve.

In accordance with a second embodiment, the shaft-fastening part and the cam-fastening part are in direct contact with each other without molding-resin therebetween. The shaft-fastening part and the cam-fastening part are configured as an integrated object. The gear is formed by resin-molding with the integrated object serving as a single insert part. The integrated object is provided by press-fitting one of the shaft-fastening part and the cam-fastening part into the other one of the shaft-fastening part and the cam-fastening part.

(First Embodiment)

Configuration of the gear subassembly of the first embodiment will be described. The gear subassembly of the first embodiment (hereinafter referred to as "subassembly") 1 will be explained with reference to FIGS. 1 to 5B. The subassembly 1 is obtained by integrating a gear 3 which is a part of reduction gears 2, and a cam 5 which is fastened to the gear 3 and is a part of a link mechanism 4. For example, the subassembly 1 is one component of an EGR system 8 that returns exhaust gas discharged from an internal combustion engine 6 into an intake passage 7.

The EGR system 8 serves as a part of an air intake and exhaust system 10 of the engine 6. For example, the EGR system 8 includes a low-pressure EGR system 12 that recirculates exhaust gas to the intake passage 7 through a low-pressure EGR passage 11, and a high-pressure EGR system 14 that recirculates exhaust gas to the intake passage 7 through a high-pressure EGR passage 13.

The air intake and exhaust system 10 includes a turbocharger 18 that rotates an exhaust turbine 17 by exhaust gas and compresses intake air through a compressor 16, which is coaxial with the exhaust turbine 17. The low-pressure EGR system 12 returns exhaust gas into the intake passage 7 through the low-pressure EGR passage 11 that communicates between an exhaust passage 19 on a downstream side of the exhaust turbine 17 in an exhaust gas flow direction, and the intake passage 7 on an upstream side of the compressor 16 in an intake air flow direction. The high-pressure EGR system 14 returns exhaust gas into the intake passage 7 through the high-pressure EGR passage 13 that communicates between the exhaust passage 19 on an upstream side of the exhaust turbine 17 in the exhaust gas flow direction, and the intake passage 7 on a downstream side of a throttle device 20 in the intake air flow direction.

Except for the EGR system 8 and the turbocharger 18, the air intake and exhaust system 10 includes, for example, an air cleaner 21, an inter cooler 22, and a diesel particulate filter (DPF) 23, which are widely known. Moreover, the air intake and exhaust system 10 includes a predetermined electronic control unit (not shown: hereinafter referred to as an ECU). The ECU controls operations of the devices provided for the low-pressure and high-pressure EGR systems 12, 14 to realize air intake and exhaust in accordance with an operational state of the engine 6.

The low-pressure EGR system 12 includes a low-pressure EGR valve 25 that changes an opening degree of the low-pressure EGR passage 11 so as to increase or decrease the amount of exhaust gas recirculated; an electric motor 26 that generates output for driving the low-pressure EGR valve 25; the reduction gears 2 that decelerate the output of the electric motor 26 to transmit it to the low-pressure EGR valve 25; an intake throttle valve 27 that reduces a flow of intake air at the intake passage 7 on an upstream side of its connecting portion with the low-pressure EGR passage 11 in the intake air flow direction; the link mechanism 4 that synchronizes movement of the intake throttle valve 27 with movement of the low-pressure EGR valve 25; and a low-pressure EGR cooler 28 that cools exhaust gas on an upstream side of the low-pressure EGR valve 25 in the exhaust gas flow direction.

The reduction gears 2 include a major diameter gear 3 that is fastened to the rotatable shaft 30 of the low-pressure EGR valve 25 to rotate with the rotatable shaft 30 serving as the rotation center; a minor diameter gear 31 that is fastened to an output shaft of the electric motor 26; and an intermediate gear 32 having in a coaxial manner major diameter gear teeth engaged with the teeth of the gear 31 and minor diameter gear teeth engaged with the teeth of the gear 3.

The intake throttle valve 27 is for promoting the recirculation of exhaust gas via the low-pressure EGR passage 11 through the reduction of the intake passage 7 to increase a differential pressure between the exhaust passage 19 and the intake passage 7. The link mechanism 4 transmits the output of the electric motor 26 serving as an actuator of the low-pressure EGR valve 25 to the intake throttle valve 27 so as to rotate the intake throttle valve 27 by the output of the electric motor 26. Accordingly, the link mechanism 4 eliminates an actuator for the intake throttle valve 27 to achieve cost reduction of the low-pressure EGR system 12.

The link mechanism 4 includes the cam 5 serving as a driving-side member that is incorporated coaxially with the low-pressure EGR valve 25 and the gear 3 and rotated by the output of the electric motor 26; and a linking lever 34 serving as a driven-side member that is incorporated coaxially with the intake throttle valve 27 and rotated upon transmission of the output of the electric motor 26 from the cam 5. The cam 5 includes a cam profile 35 that shows a synchronization pattern of the intake throttle valve 27 relative to the low-pressure EGR valve 25. The linking lever 34 includes a driven pin 36 which is in contact with the cam profile 35 and to which the output of the electric motor 26 is transmitted from the cam 5. The linking lever 34 rotates the intake throttle valve 27 by the rotation of the lever 34 as a result of the output transmitted through the driven pin 36.

A synchronization relationship between the low-pressure EGR valve 25 and the intake throttle valve 27 through the link mechanism 4 is set such that when the low-pressure EGR valve 25 rotates on an open side (direction to open the low-pressure EGR passage 11), the intake throttle valve 27 rotates on a closed side (direction to close the intake passage 7).

The gear 3 is urged by a torsion spring 37 in a direction to rotate the low-pressure EGR valve 25 on its closed side, and the linking lever 34 is urged by a torsion spring 38 in a direction to rotate the intake throttle valve 27 on its open side. The output of the electric motor 26 is transmitted to the low-pressure EGR valve 25 through the reduction gears 2 so as to rotate the low-pressure EGR valve 25 on its open side against urging force of the torsion spring 37. The output of the electric motor 26 is transmitted to the intake throttle valve 27 through the reduction gears 2 and the link mechanism 4 so as to rotate the intake throttle valve 27 on its closed side against urging force of the torsion spring 38.

In addition, the high-pressure EGR system 14 includes, for example, a high-pressure EGR valve 40 that changes an opening degree of the high-pressure EGR passage 13 so as to increase or decrease the amount of exhaust gas recirculated; a high-pressure EGR cooler 41 that cools exhaust gas on an upstream side of the high-pressure EGR valve 40 in the exhaust gas flow direction; a cooler bypass 42 that bypasses the high-pressure EGR cooler 41 to guide exhaust gas into the intake passage 7; and a changeover valve 43 that switches a recirculation passage for exhaust gas between the high-pressure EGR cooler 41 and the cooler bypass 42.

Next, the subassembly 1 will be described with reference mainly to FIGS. 3A to 5B. The subassembly 1 is obtained as a result of integrating the gear 3 that constitutes the reduction gears 2 and the cam 5 that constitutes the link mechanism 4, by fastening via a screw 45.

The gear 3 is provided by resin-forming whereby a metal plate (shaft-fastening part) 46 used for fastening of the gear 3 to the rotatable shaft 30, and a metal nut (cam-fastening part) 47 used for screw-fastening of the gear 3 to the cam 5 are insert parts. A fitting hole 49, into which one end part 48 of the rotatable shaft 30 is fitted, is formed through the metal plate 46. The rotatable shaft 30 and the plate 46 are fastened together as a result of the one end part 48 being fitted into the fitting hole 49. In addition, a permanent magnet 50 is attached on an inner peripheral surface of the gear 3, and the permanent magnet 50 serves as a part of a rotational angle sensor that detects a rotation angle of the low-pressure EGR valve 25.

Effects of the subassembly 1 of the first embodiment will be described. The subassembly 1 of the first embodiment includes the gear 3 which is a part of reduction gears 2, and the cam 5 which is fastened to the gear 3 and is a part of the link mechanism 4. The gear 3 is provided by resin-forming whereby the metal plate 46 used for fastening of the gear 3 to the rotatable shaft 30, and the metal nut 47 used for fastening of the gear 3 to the cam 5 are insert parts.

Therefore, in the gear 3, which constitutes the subassembly 1, a part which requires high strength is formed from metal, and a part which does not require very high strength is made from resin. Accordingly, the weight of the gear 3 can be reduced compared to a case of the entire gear 3 being made from metal. As a result, weight saving of the subassembly 1 obtained by integrating the gear 3 which constitutes a part of reduction gears 2, and the cam 5 which constitutes a part of the link mechanism 4 can be achieved.

The subassembly 1 is applied to the low-pressure EGR system 12 including the intake throttle valve 27 in the air intake and exhaust system 10 of the engine 6. The gear 3 is configured as a part of the reduction gears 2 that decelerate the output of the electric motor 26 to transmit it to the low-pressure EGR valve 25. The cam 5 is configured as a part of the link mechanism 4 that synchronizes the movement of the intake throttle valve 27 with the movement of the low-pressure EGR valve 25.

The torsion springs 37, 38 that urge the low-pressure EGR valve 25 and the intake throttle valve 27 respectively in the opposite directions from directions of their movements due to the output of the electric motor 26 are provided for the low-pressure EGR system 12 having the intake throttle valve 27. The torsion springs 37, 38 strongly urge the low-pressure EGR valve 25 and the intake throttle valve 27 respectively. For this reason, the strong urging force of the torsion spring 37 is transmitted to the plate 46 through the rotatable shaft 30, and the strong urging force of the torsion spring 38 is transmitted through the link mechanism 4 to the nut 47.

Therefore, in such a low-pressure EGR system 12, high strength is required for the plate 46 and the nut 47, and the plate 46 and the nut 47 have a substantial need to be formed from metal. Thus, to increase the strength of the gear 3 by making only the plate 46 and the nut 47 out of metal is an extremely effective method for achieving the weight saving of the subassembly 1.

(Second Embodiment)

Figure 6B:
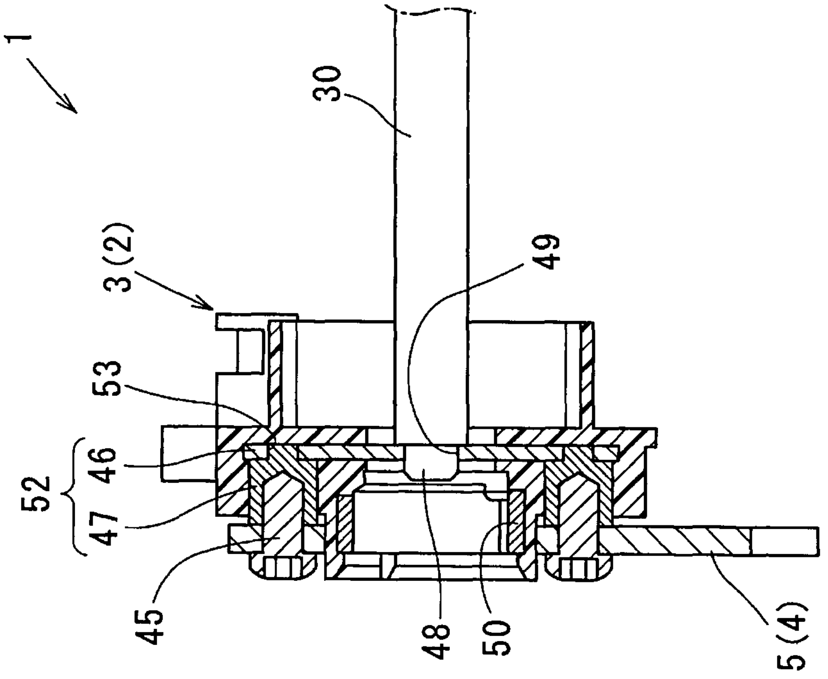
FIG. 6B is a sectional view taken along a line VIB-VIB in FIG. 6A.
Figure 6A:
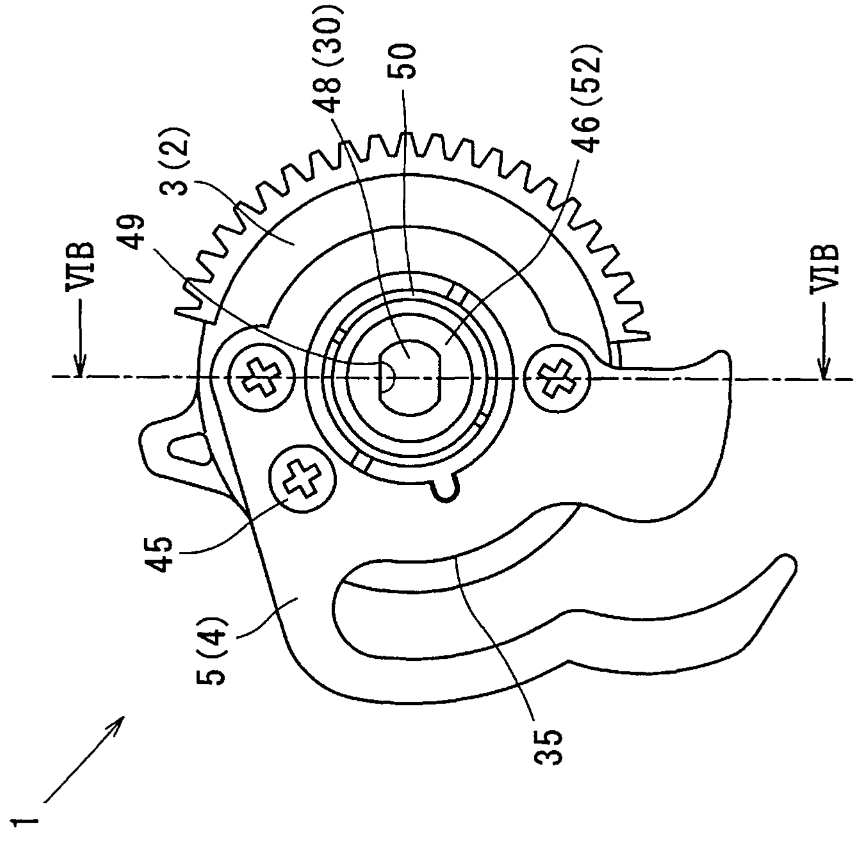
FIG. 6A is a plan view illustrating a gear subassembly in accordance with a second embodiment.
Figure 7:
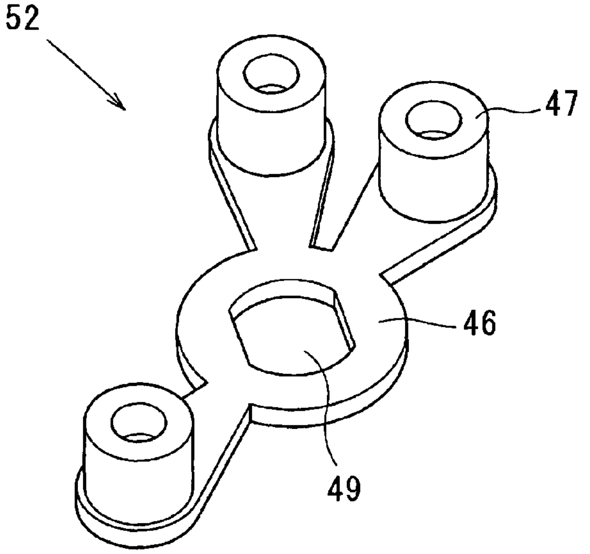
FIG. 7 is a perspective view illustrating an integrated object of a plate and a nut in accordance with the second embodiment.
Figure 8:
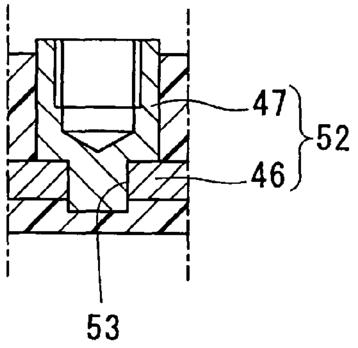
FIG. 8 is a diagram illustrating a production method for the integrated object of the second embodiment.

In the subassembly 1 of the second embodiment, as illustrated in FIGS. 6A to 7, a plate 46 and a nut 47 are configured as an integrated object 52, and a gear 3 is provided by resin-forming with the integrated object 52 as a single insert part. As illustrated in FIG. 8, a hole 53 for press-fitting is provided for the plate 46, and the nut 47 is press-fitted into the plate 46, so that the integrated object 52 is provided.

As a result, the plate 46 and the nut 47 are in direct contact with each other without molding-resin therebetween. Consequently, force can be transmitted from the plate 46 to the cam 5 without the molding-resin therebetween, and reliability of the subassembly 1 can thereby be improved.

Furthermore, the gear 3 is provided by resin-forming with the integrated object 52 as a single insert part. Accordingly, the number of insert parts that should be set in a die for forming the gear 3 can be reduced compared to the case of the plate 46 and the nut 47 being separately provided. For this reason, the production cost of the subassembly 1 can be reduced.

Modifications of the above embodiments will be described. The mode of the subassembly 1 is not limited to the above embodiments, and various modifications can be possible. For example, in the subassembly 1 of the second embodiment, the hole 53 for press-fitting is provided for the plate 46, and the nut 47 is press-fitted into the plate 46, so that the integrated object 52 is provided; but alternatively, a hole 53 for press-fitting may be provided for a nut 47, and a projection for press-fitting may be provided for a plate 46, and an integrated object 52 may be provided by press-fitting the plate 46 into the nut 47.

Figure 9:
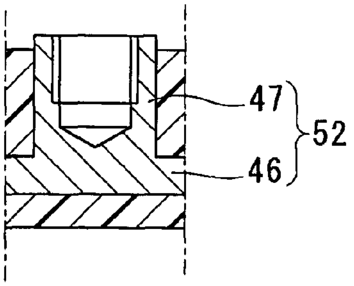
FIG. 9 is a diagram illustrating a production method for an integrated object in accordance with a modification.
Figure 10:
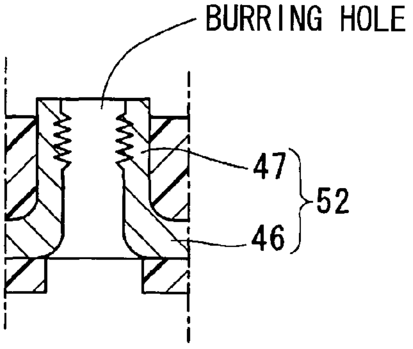
FIG. 10 is a diagram illustrating a production method for an integrated object in accordance with a modification.

In addition, an integrated object 52 can be configured as one casting (see FIG. 9), or a burring hole may be made to rise through press-working of a plate-like metallic material and then the burring hole may be formed to have a part corresponding to a screw hole of a nut 47 (see FIG. 10).

Moreover, instead of forming the plate 46 and the nut 47 as the integrated object 52, the gear 3 may be resin-formed such that the plate 46 and the nut 47 are in direct contact with each other inside the gear 3. In this case, although in resin-forming of the gear 3, the number of insert parts increases compared to the case of the integrated object 52 being used as an insert part, the force can be transmitted from the plate 46 to a cam 5 without molding-resin therebetween, since the plate 46 and the nut 47 are in direct contact inside the gear 3. Thus, the reliability of the subassembly 1 can be improved.

Furthermore, the subassembly 1 of the above embodiments is applied to the low-pressure EGR system 12 including the intake throttle valve 27, in the air intake and exhaust system 10 of the engine 6. The gear 3 is configured as a part of the reduction gears 2 that decelerate the output of the electric motor 26 to transmit it to the low-pressure EGR valve 25. The cam 5 is configured as a part of the link mechanism 4 that synchronizes the movement of the intake throttle valve 27 with the movement of the low-pressure EGR valve 25. Nevertheless, the subassembly 1 may be applicable to other uses.

To sum up, the gear subassembly 1 and the exhaust gas recirculation (EGR) system 8 in accordance with the above embodiments may be described as follows.

A gear subassembly 1 is for an exhaust gas recirculation (EGR) system 8 including an EGR valve 25 and a rotatable shaft 30 provided for the EGR valve 25. The gear subassembly 1 includes a gear 3 and a cam 5. The gear 3 is a part of reduction gears 2 and is fastened to the rotatable shaft 30 to rotate therearound. The cam 5 is fastened to the gear 3 and is a part of a link mechanism 4. The gear 3 includes a metal shaft-fastening part 46 used for fastening the gear 3 to the rotatable shaft 30, and a metal cam-fastening part 47 used for fastening the gear 3 to the cam 5. The gear 3 is formed by resin-molding with the shaft-fastening part 46 and the cam-fastening part 47 serving as insert parts.

Therefore, in the gear 3, which constitutes the gear subassembly 1, a part which requires high strength is formed from metal, and a part which does not require very high strength is made from resin. Accordingly, the weight of the gear 3 can be reduced compared to a case of the entire gear 3 being made from metal. As a result, weight saving of the gear subassembly 1 obtained by integrating the gear 3 which constitutes a part of reduction gears 2, and the cam 5 which constitutes a part of the link mechanism 4 can be achieved.

The shaft-fastening part 46 and the cam-fastening part 47 may be in direct contact with each other without molding-resin therebetween. Accordingly, the force can be transmitted from the shaft-fastening part 46 to the cam 5 without molding-resin therebetween. Thus, the reliability of the gear subassembly 1 can be improved.

The shaft-fastening part 46 and the cam-fastening part 47 may be configured as an integrated object 52. The gear 3 may be formed by resin-molding with the integrated object 52 serving as a single insert part. Accordingly, the number of insert parts that should be set in a die for forming the gear 3 can be reduced compared to the case of the shaft-fastening part 46 and the cam-fastening part 47 being separately provided. For this reason, the production cost of the gear subassembly 1 can be reduced.

The integrated object 52 may be provided by press-fitting one of the shaft-fastening part 46 and the cam-fastening part 47 into the other one of the shaft-fastening part 46 and the cam-fastening part 47. Furthermore, the integrated object 52 may be a casting. In addition, the integrated object 52 may be formed from a plate-like metallic material and configured as a burring hole, which is made to rise from the metallic material through press-working of the metallic material. At least one of the shaft-fastening part 46 and the cam-fastening part 47 may be provided by processing the burring hole.

An exhaust gas recirculation (EGR) system 8 is a part of an air intake and exhaust system 10 for an internal combustion engine 6. The air intake and exhaust system 10 includes a turbocharger 18, an exhaust passage 19 for exhaust gas, and an intake passage 7 for intake air. The turbocharger 18 has an exhaust turbine 17 and a compressor 16 coaxial with the exhaust turbine 17, and is configured to rotate the exhaust turbine 17 by exhaust gas discharged from the engine 6 and to compress intake air drawn into the engine 6 through the compressor 16. The EGR system 8 includes the gear subassembly 1, an EGR passage 11, the EGR valve 25, an electric motor 26, and an intake throttle valve 27. A part of exhaust gas is recirculated through the EGR passage 11 from the exhaust passage 19 on a downstream side of the exhaust turbine 17 in a flow direction of exhaust gas into the intake passage 7 on an upstream side of the compressor 16 in a flow direction of intake air. The EGR valve 25 is configured to open or close the EGR passage 11. The electric motor 26 is configured to generate output to drive the EGR valve 25. The intake throttle valve 27 is disposed in the intake passage 7 to reduce a flow of intake air on an upstream side of a connecting portion between the intake passage 7 and the EGR passage 11 in the flow direction of intake air. The reduction gears 2 are configured to decelerate the output of the electric motor 26 and transmit the decelerated output to the EGR valve 25. The rotatable shaft 30 is a rotation center of the EGR valve 25. The link mechanism 4 is configured to synchronize movement of the intake throttle valve 27 with movement of the EGR valve 25.

This aspect of the disclosure uses the gear subassembly 1 for the EGR system 8 that recirculates exhaust gas into the intake passage 7 through the low-pressure EGR passage 11. The gear subassembly 1 is obtained by combining together the gear 3 fastened to the rotatable shaft 30 of the EGR valve 25, and the cam 5 having the cam profile 35 that shows a synchronization pattern of the intake throttle valve 27 relative to the EGR valve 25.

In the EGR system 8 having these EGR valve 25 and intake throttle valve 27, urging means such as the torsion springs 37, 38 that urge the EGR valve 25 and the intake throttle valve 27 respectively in the opposite directions from directions of their movements due to the output of the electric motor 26 are provided, and these urging means strongly urge the EGR valve 25 and the intake throttle valve 27. For this reason, the strong urging force is transmitted through the rotatable shaft 30 from the urging means 37 for urging the EGR valve 25 to the shaft-fastening part 46, and the strong urging force is transmitted through the link mechanism 4 to a cam-fastening part 47 from the urging means 38 for urging the intake throttle valve 27.

Thus, in such an EGR system 8, the shaft-fastening part 46 and the cam-fastening part 47 need high strength, and they have a substantial need to be formed from metal. Accordingly, the above-described effects can be significantly produced.

Additional advantages and modifications will readily occur to those skilled in the art. The disclosure in its broader terms is therefore not limited to the specific details, representative apparatus, and illustrative examples shown and described.

What is claimed is:

1. A gear subassembly for an exhaust gas recirculation (EGR) system including:

an EGR valve; and a rotatable shaft provided for the EGR valve, the gear subassembly comprising:

a gear that is a part of reduction gears and that is fastened to the rotatable shaft located at a rotation center of the gear to rotate therearound;

a cam that is fastened to the gear and is a part of a link mechanism; and a plurality of screws, wherein:

the gear includes a metal shaft-fastening part used for fastening the gear to the rotatable shaft, and a plurality of metal cam-fastening parts used for fastening the gear to the cam; a first fitting hole and a plurality of second fitting holes, wherein:

the first fitting hole is arranged at the rotation center of the gear and is configured to receive the metal shaft fastening part and the rotatable shaft;

the plurality of second fitting holes are arranged between the rotation center of the gear and a gear tooth and are configured to receive the plurality of metal cam fastening parts;

the gear is formed by resin-molding with the shaft-fastening part and the plurality of cam-fastening parts serving as insert parts inserted into the gear; and the gear and the cam are integrated by fastening via the plurality of screws through the plurality of cam-fastening parts, which is inserted in the gear.

2. The gear subassembly according to claim 1, wherein the shaft-fastening part and the cam-fastening part are in direct contact with each other without molding-resin therebetween.

3. The gear subassembly according to claim 1, wherein:

the shaft-fastening part and the cam-fastening part are configured as an integrated object; and the gear is formed by resin-molding with the integrated object serving as a single insert part.

4. The gear subassembly according to claim 3, wherein the integrated object is provided by press-fitting one of the shaft-fastening part and the cam-fastening part into the other one of the shaft-fastening part and the cam-fastening part.

5. The gear subassembly according to claim 3, wherein the integrated object is a casting.

6. The gear subassembly according to claim 3, wherein:

the integrated object is formed from a plate-like metallic material and configured as a burring hole, which is made to rise from the metallic material through press-working of the metallic material; and at least one of the shaft-fastening part and the cam-fastening part is provided by processing the burring hole.

7. An exhaust gas recirculation (EGR) system that is a part of an air intake and exhaust system for an internal combustion engine, wherein the air intake and exhaust system includes:

a turbocharger that has an exhaust turbine and a compressor coaxial with the exhaust turbine and that is configured to rotate the exhaust turbine by exhaust gas discharged from the engine and to compress intake air drawn into the engine through the compressor;

an exhaust passage for exhaust gas; and an intake passage for intake air, the EGR system comprising:

the gear subassembly recited in claim 1;

an EGR passage through which a part of exhaust gas is recirculated from the exhaust passage on a downstream side of the exhaust turbine in a flow direction of exhaust gas into the intake passage on an upstream side of the compressor in a flow direction of intake air;

the EGR valve that is configured to open or close the EGR passage;

an electric motor that is configured to generate output to drive the EGR valve; and an intake throttle valve that is disposed in the intake passage to reduce a flow of intake air on an upstream side of a connecting portion between the intake passage and the EGR passage in the flow direction of intake air, wherein:

the reduction gears are configured to decelerate the output of the electric motor and transmit the decelerated output to the EGR valve;

the rotatable shaft is a rotation center of the EGR valve; and the link mechanism is configured to synchronize movement of the intake throttle valve with movement of the EGR valve.

* * * * *